United States Patent
Ibikunle et al.

(10) Patent No.: US 7,983,468 B2
(45) Date of Patent: Jul. 19, 2011

(54) METHOD AND SYSTEM FOR EXTRACTING INFORMATION FROM DOCUMENTS BY DOCUMENT SEGREGATION

(75) Inventors: Tayo Ibikunle, Wynnewood, PA (US); Ehud Karnin, Koranit (IL); William A. Liberis, Stamford, CT (US); Tomasz J. Nowicki, Briarcliff Manor, NY (US); Michael J. Reilly, Dublin (IR); Howard E. Sachar, Mount Kisco, NY (US); Charles P. Tresser, New York, NY (US); Eugene Walach, Haifa (IL); David A. Weeshoff, La Crescenta, CA (US)

(73) Assignees: JP Morgan Chase Bank, New York, NY (US); International Business Machines Corporation, Armonk, NY (US)

( * ) Notice: Subject to any disclaimer, the term of this patent is extended or adjusted under 35 U.S.C. 154(b) by 1318 days.

(21) Appl. No.: 11/053,681

(22) Filed: Feb. 9, 2005

(65) Prior Publication Data

US 2006/0177118 A1 Aug. 10, 2006

(51) Int. Cl.
*G06K 9/00* (2006.01)
(52) U.S. Cl. ........ 382/137; 235/379; 382/190; 382/218; 705/45; 705/75; 715/251
(58) Field of Classification Search .............. 235/379, 235/380; 382/137, 138, 213, 311, 317, 190; 705/42, 43, 45, 30, 10, 44, 64; 715/541
See application file for complete search history.

(56) References Cited

U.S. PATENT DOCUMENTS

| | | | |
|---|---|---|---|
| 3,653,480 A | 4/1972 | Yamamoto et al. | |
| 4,321,672 A | 3/1982 | Braun et al. | |
| 4,396,985 A | 8/1983 | Ohara | |
| 4,617,457 A | 10/1986 | Granzow et al. | |
| 4,672,377 A | 6/1987 | Murphy et al. | |
| 4,700,055 A | 10/1987 | Kashkashian, Jr. | |
| 4,797,913 A | 1/1989 | Kaplan et al. | |
| 4,799,156 A | 1/1989 | Shavit et al. | |
| 4,812,628 A | 3/1989 | Boston et al. | |
| 4,823,264 A | 4/1989 | Deming | |
| 4,944,532 A * | 7/1990 | Pollard | 283/70 |
| 5,122,950 A | 6/1992 | Benton et al. | |
| 5,175,682 A | 12/1992 | Higashiyama et al. | |
| 5,193,121 A * | 3/1993 | Elischer et al. | 382/138 |
| 5,198,975 A | 3/1993 | Baker et al. | |
| 5,225,978 A | 7/1993 | Petersen et al. | |

(Continued)

FOREIGN PATENT DOCUMENTS

EP 0 099 999 2/1984

(Continued)

OTHER PUBLICATIONS

T.M. Ha, et al. "Image Processing for Document Image Analysis," Handbook of Character Recognition and Document Image Analysis, World Scientific, Chapter 1, pp. 1-47, Singapore, 1997.

(Continued)

*Primary Examiner* — Gregory M Desire
(74) *Attorney, Agent, or Firm* — McGinn Intellectual Property Law Group, PLLC

(57) ABSTRACT

A method (and system) for extracting information from a document, includes segregating a set of documents from a plurality of documents based on a likelihood that at least one document in the set of documents carries an instance of a preset information.

30 Claims, 8 Drawing Sheets

U.S. PATENT DOCUMENTS

| | | | |
|---|---|---|---|
| 5,237,159 A | 8/1993 | Stephens et al. | |
| 5,237,620 A | 8/1993 | Deaton et al. | |
| 5,283,829 A | 2/1994 | Anderson | |
| 5,287,269 A | 2/1994 | Dorrough et al. | |
| 5,311,594 A | 5/1994 | Penzias | |
| 5,321,238 A | 6/1994 | Kamata et al. | |
| 5,326,959 A | 7/1994 | Perazza | |
| 5,336,870 A | 8/1994 | Hughes et al. | |
| 5,350,906 A | 9/1994 | Brody et al. | |
| 5,367,581 A | 11/1994 | Abel et al. | |
| 5,373,550 A | 12/1994 | Campbell et al. | |
| 5,396,417 A | 3/1995 | Burks et al. | |
| 5,402,474 A | 3/1995 | Miller et al. | |
| 5,412,190 A | 5/1995 | Josephson et al. | |
| 5,420,405 A | 5/1995 | Chasek | |
| 5,424,938 A | 6/1995 | Wagner et al. | |
| 5,430,644 A | 7/1995 | Deaton et al. | |
| 5,444,794 A | 8/1995 | Uhland, Sr. | |
| 5,444,841 A | 8/1995 | Glaser et al. | |
| 5,446,740 A | 8/1995 | Yien et al. | |
| 5,448,471 A | 9/1995 | Deaton et al. | |
| 5,465,206 A | 11/1995 | Hilt et al. | |
| 5,479,494 A | 12/1995 | Clitherow | |
| 5,479,532 A | 12/1995 | Abel et al. | |
| 5,483,445 A | 1/1996 | Pickering | |
| 5,484,988 A | 1/1996 | Hills et al. | |
| 5,504,677 A | 4/1996 | Pollin | |
| 5,504,822 A * | 4/1996 | Holt | 382/218 |
| 5,506,691 A | 4/1996 | Bednar et al. | |
| 5,513,250 A | 4/1996 | McAllister | |
| 5,537,314 A | 7/1996 | Kanter | |
| 5,544,040 A | 8/1996 | Gerbaulet | |
| 5,550,734 A | 8/1996 | Tarter et al. | |
| 5,551,021 A | 8/1996 | Harada et al. | |
| 5,568,489 A | 10/1996 | Yien et al. | |
| 5,583,759 A | 12/1996 | Geer | |
| 5,590,196 A | 12/1996 | Moreau | |
| 5,592,377 A | 1/1997 | Lipkin | |
| 5,592,378 A | 1/1997 | Cameron et al. | |
| 5,621,201 A | 4/1997 | Langhans et al. | |
| 5,630,073 A * | 5/1997 | Nolan | 705/45 |
| 5,631,984 A * | 5/1997 | Graf et al. | 382/317 |
| 5,640,577 A | 6/1997 | Scharmer | |
| 5,649,117 A | 7/1997 | Landry | |
| 5,652,786 A | 7/1997 | Rogers | |
| 5,659,165 A | 8/1997 | Jennings et al. | |
| 5,659,469 A | 8/1997 | Deaton et al. | |
| 5,673,320 A * | 9/1997 | Ray et al. | 713/176 |
| 5,677,955 A * | 10/1997 | Doggett et al. | 705/76 |
| 5,679,938 A | 10/1997 | Templeton et al. | |
| 5,679,940 A | 10/1997 | Templeton et al. | |
| 5,692,132 A | 11/1997 | Hogan | |
| 5,699,528 A | 12/1997 | Hogan | |
| 5,703,344 A | 12/1997 | Bezy et al. | |
| 5,708,422 A | 1/1998 | Blonder et al. | |
| 5,710,889 A | 1/1998 | Clark et al. | |
| 5,715,298 A | 2/1998 | Rogers | |
| 5,715,314 A | 2/1998 | Payne et al. | |
| 5,715,399 A | 2/1998 | Bezos | |
| 5,724,424 A | 3/1998 | Gifford | |
| 5,727,249 A | 3/1998 | Pollin | |
| 5,748,780 A | 5/1998 | Stolfo | |
| 5,751,842 A | 5/1998 | Riach et al. | |
| 5,770,843 A | 6/1998 | Rose et al. | |
| 5,793,861 A | 8/1998 | Haigh | |
| 5,794,221 A | 8/1998 | Egendorf | |
| 5,802,498 A | 9/1998 | Comesanas | |
| 5,819,236 A | 10/1998 | Josephson | |
| 5,823,463 A | 10/1998 | Fissmann et al. | |
| 5,826,241 A | 10/1998 | Stein et al. | |
| 5,826,245 A | 10/1998 | Sandberg-Diment | |
| 5,832,460 A | 11/1998 | Bednar et al. | |
| 5,832,463 A | 11/1998 | Funk | |
| 5,832,464 A | 11/1998 | Houvener et al. | |
| 5,835,603 A | 11/1998 | Coutts et al. | |
| 5,852,812 A | 12/1998 | Reeder | |
| 5,859,419 A | 1/1999 | Wynn | |
| 5,864,609 A | 1/1999 | Cross et al. | |
| 5,870,456 A | 2/1999 | Rogers | |
| 5,870,721 A | 2/1999 | Norris | |
| 5,870,725 A | 2/1999 | Bellinger et al. | |
| 5,873,072 A | 2/1999 | Knight et al. | |
| 5,883,810 A | 3/1999 | Franklin et al. | |
| 5,884,288 A | 3/1999 | Chang et al. | |
| 5,890,141 A * | 3/1999 | Carney et al. | 705/45 |
| 5,897,625 A | 4/1999 | Gustin et al. | |
| 5,898,157 A * | 4/1999 | Mangili et al. | 235/380 |
| 5,903,881 A | 5/1999 | Schrader et al. | |
| 5,910,988 A | 6/1999 | Ballard | |
| 5,917,965 A | 6/1999 | Cahill et al. | |
| 5,920,847 A | 7/1999 | Kolling et al. | |
| 5,930,778 A | 7/1999 | Geer | |
| 5,940,811 A | 8/1999 | Norris | |
| 5,940,844 A | 8/1999 | Cahill et al. | |
| 5,943,656 A | 8/1999 | Crooks et al. | |
| 5,945,653 A | 8/1999 | Walker et al. | |
| 5,966,698 A | 10/1999 | Pollin | |
| 5,978,780 A | 11/1999 | Watson | |
| 6,003,762 A | 12/1999 | Hayashida | |
| 6,006,208 A | 12/1999 | Forst et al. | |
| 6,009,442 A | 12/1999 | Chen et al. | |
| 6,032,137 A | 2/2000 | Ballard | |
| 6,038,553 A | 3/2000 | Hyde, Jr. | |
| 6,041,315 A | 3/2000 | Pollin | |
| 6,065,675 A | 5/2000 | Teicher | |
| 6,105,011 A | 8/2000 | Morrison, Jr. | |
| 6,111,858 A | 8/2000 | Greaves et al. | |
| 6,129,273 A | 10/2000 | Shah | |
| 6,149,056 A | 11/2000 | Stinson et al. | |
| 6,181,814 B1 * | 1/2001 | Carney | 382/137 |
| 6,301,379 B1 | 10/2001 | Thompson et al. | |
| 6,338,049 B1 | 1/2002 | Walker et al. | |
| 6,339,766 B1 | 1/2002 | Gephart | |
| 6,490,568 B1 | 12/2002 | O'Mara et al. | |
| 6,611,598 B1 * | 8/2003 | Hayosh | 380/54 |
| 6,778,703 B1 * | 8/2004 | Zlotnick | 382/218 |
| 6,845,366 B1 * | 1/2005 | Hassanein et al. | 705/45 |
| 7,020,320 B2 * | 3/2006 | Filatov | 382/137 |
| 7,133,536 B2 * | 11/2006 | Moon et al. | 382/100 |
| 7,197,173 B2 * | 3/2007 | Jones et al. | 382/135 |
| 7,251,656 B2 * | 7/2007 | Keown et al. | 1/1 |
| 7,360,686 B2 * | 4/2008 | Hoch et al. | 235/379 |
| 7,386,511 B2 * | 6/2008 | Buchanan et al. | 705/45 |
| 7,512,564 B1 * | 3/2009 | Geer | 705/45 |
| 7,584,128 B2 * | 9/2009 | Mason et al. | 705/35 |
| 7,729,990 B2 * | 6/2010 | Marceau et al. | 705/45 |
| 2001/0047334 A1 | 11/2001 | Nappe et al. | |
| 2001/0047489 A1 | 11/2001 | Ito et al. | |
| 2002/0013728 A1 | 1/2002 | Wilkman | |
| 2002/0038363 A1 | 3/2002 | MacLean | |
| 2002/0077978 A1 | 6/2002 | O'Leary et al. | |
| 2003/0061132 A1 * | 3/2003 | Yu et al. | 705/30 |
| 2003/0132281 A1 | 7/2003 | Jones et al. | 235/379 |
| 2003/0208434 A1 | 11/2003 | Posplawski et al. | |
| 2003/0225638 A1 * | 12/2003 | Secola | 705/30 |
| 2004/0010466 A1 * | 1/2004 | Anderson | 705/45 |
| 2004/0016683 A1 * | 1/2004 | Maloney | 209/583 |
| 2004/0078311 A1 * | 4/2004 | Robinson | 705/35 |
| 2004/0078328 A1 | 4/2004 | Talbert et al. | |
| 2004/0118658 A1 * | 6/2004 | Schott et al. | 194/210 |
| 2004/0133516 A1 * | 7/2004 | Buchanan et al. | 705/42 |
| 2004/0133517 A1 * | 7/2004 | Zubizarreta | 705/44 |
| 2004/0162775 A1 | 8/2004 | Winklevoss et al. | |
| 2004/0237047 A1 * | 11/2004 | Houle et al. | 715/541 |
| 2005/0015341 A1 * | 1/2005 | Jackson | 705/45 |
| 2005/0018896 A1 * | 1/2005 | Heit et al. | 382/137 |
| 2005/0065893 A1 * | 3/2005 | Josephson | 705/64 |
| 2005/0097048 A1 * | 5/2005 | Hassanein et al. | 705/43 |
| 2005/0108167 A1 * | 5/2005 | Cordery et al. | 705/45 |
| 2005/0108168 A1 * | 5/2005 | Halpin et al. | 705/45 |
| 2005/0129270 A1 * | 6/2005 | Prakash | 382/100 |
| 2006/0041506 A1 * | 2/2006 | Mason et al. | 705/42 |
| 2006/0177118 A1 * | 8/2006 | Ibikunle et al. | 382/137 |

FOREIGN PATENT DOCUMENTS

| WO | WO 91/16691 | 10/1991 |
|---|---|---|
| WO | WO 93/08545 | 4/1993 |
| WO | WO 96/08783 | 3/1996 |
| WO | WO 02/063432 A2 | 8/2002 |

OTHER PUBLICATIONS

U. Kressel, et al., "Pattern Classification Techniques Based on Function Approximation," Handbook of CharacterRecognition and Document Image Analysis, World Scientific, Chapter 2, pp. 49-78, Singapore, 1997.

L. Lam, et al., "Combination of Multiple Classifier Decision for Optical Character Recognition," Handbook of Character Recognition and Document Image Analysis, World Scientific, Chapter 3, pp. 79-101 Singapore, 1997.

A. Agarwal, et al., "Bank Check Analysis and Recognition by Computers," Handbook of Character Recognition and Document Image Analysis, World Scientific, Chapter 24, pp. 623-651, Singapore, 1997.

M. Okada, et al., "A Robust Approach to Extract User Entered Information from Personal Bank Checks," Progress in Handwriting Recognition, World Scientific, A.C. Downton and S. Impedovo Eds., pp. 459-487, Singapore, 1996.

P. Pedrazi, et al., "Simple Feature Extraction for Handwritten Character Recognition," Proceedings of IEEE International Conference on Image Processing, pp. 320-323, 1995.

J.C. Simon, et al., "A System for the Recognition of Handwritten Literal Amounts of Checks," Proc. of Document Analysis Systems, 94, Kaiserslautern, Germany, 1994.

G. Kaufmann, et al., "Recognition of Cursively Handwritten Words Using a Combined Normalization/Perturbation Appeach," pp. 21-28, Progress in Handwriting Recognition, World Scientific, A.C. Downton and S. Impedovo Eds., pp. 459-487, Singapore, 1996.

Zadrozny, et al., "A SImple Method for Cost-Sensitive Learning," IBM Technical Report RC22666.

K. Chung, et al., "An Application of Feature Selection Based on Neural Network Pruning to Handwritten Character Recognition," Progress in Handwriting Recognition, World Scientific, A.C. Downton and S. Impedovo Eds., pp. 205-210, Singapore, 1996.

E.H. Ratzlaff, et al., "Search Issues in the IBM Large Vocabulary Unconstrained Handwriting Recognizer," Progress in Handwriting Recognition, World Scientific, A.C. Downton and S. Impedovo Eds., pp. 429-436, Singapore, 1996.

G. Dimauro, et al., "Multiple Experts: A New Methodology for the Evaluation of the Combination Processes," Progress in Handwriting Recognition, World Scientific, A.C. Downton and S. Impedovo Eds., pp. 4329-4335, Singapore, 1996.

PCT International Search Report, PCT Application No. PCT/US01/42979, Credit/Debit/ATMs Section, Nov. 8, 2001.

Valerie Block, "Blockbuster Running Test of a Stored Value Card", The American Banker, Sep. 1, 1995.

Melinda Norris, "First Data Unit Develops Blockbuster Cash Card", Business Section, p. 16, Omaha World Herald, Jan. 19, 1996.

"First Data Markets Stored-Value Cards", Cards International, p. 5, Jan. 30, 1996.

Rachel-Emma Silverman, "A New Strategy for Giving Away Your Money", pp. D1-D2, Oct. 6, 2004.

"Cardflash Daily Payment Card News", CardWeb.com Inc., Frederick, Maryland, Sep. 23, 2004.

"The Stars in the Sky Flicker, and Fund Stars Do the Same".

"CESNaBANCO introduces stored value card technology; Blockbuster Video is first merchant partner", Business Wire, Jan. 15, 1996, Omaha, Nebraska.

Priya Malhotra, "Clearing House Enumerates e-Payment Ills", American Banker, vol. 167, No. 154, Aug. 13, 2002.

Newsbyte, Feb. 15, 1995, 2 pages.

"Wells Fargo Rolls Out Nationwide Lockbox Check Conversion", PR Newswire, Financial News Section, Apr. 22, 2003.

N. Gorski, "Practical combination of multiple classifiers", Progress in Handwriting Recognition, World Scientific, A.C. Downton and S. Impedevo Eds., pp. 277-284, Singapore, 1996.

J.T. Favata, "Off-line handwritten sentence recognition", Progress in Handwriting Recognition, World Scientific, A.C. Downton and S. Impedevo Eds., pp. 393-398, Singapore, 1996.

\* cited by examiner

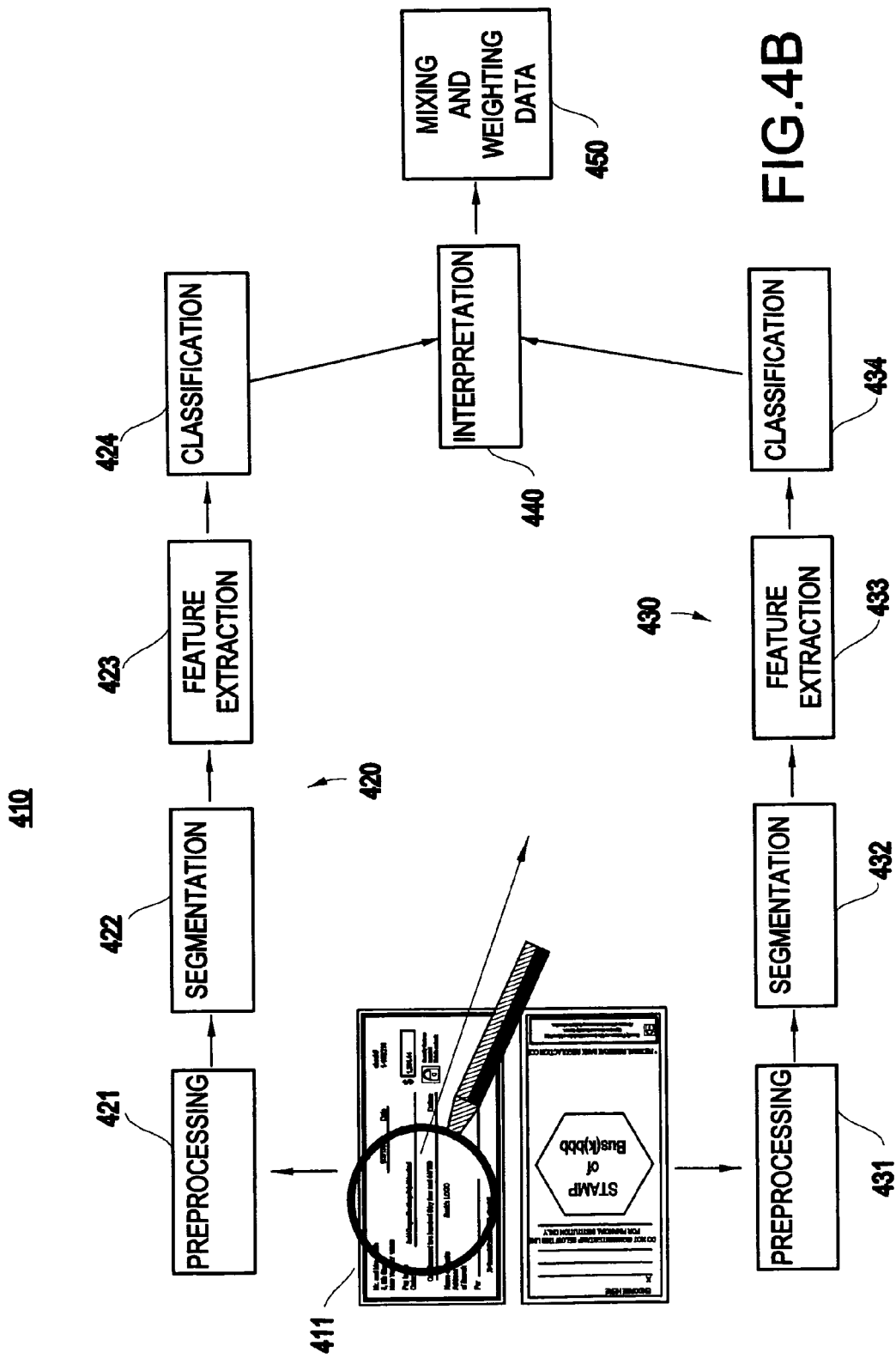

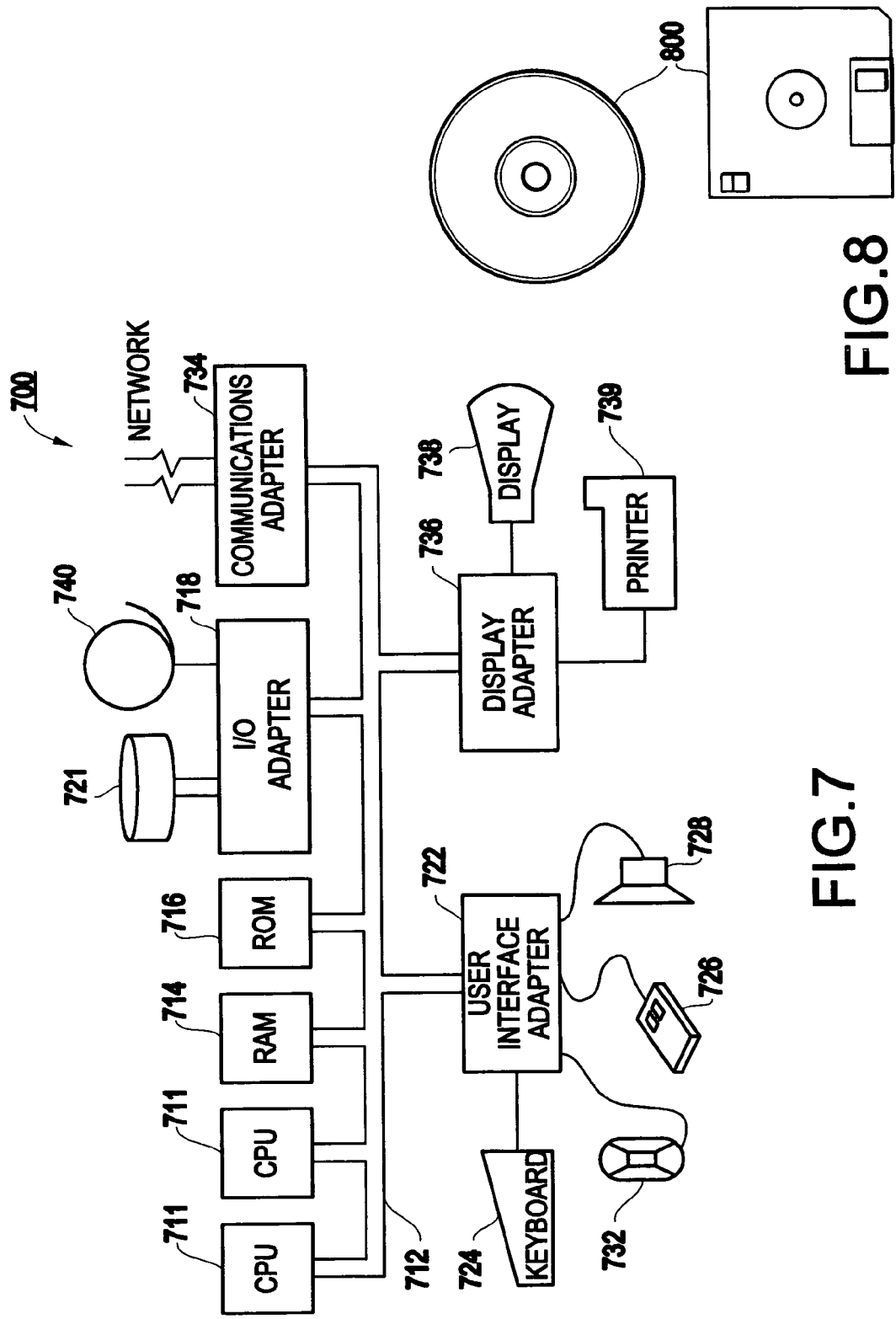

METHOD AND SYSTEM FOR EXTRACTING INFORMATION FROM DOCUMENTS BY DOCUMENT SEGREGATION

BACKGROUND OF THE INVENTION

1. Field of the Invention

The present invention generally relates to a method and system for automated extraction of information from human readable sources, and more particularly to a method and system for handwritten text recognition by unknown writers from documents carrying such text. In an exemplary embodiment, the present invention relates to a method and system for automatically extracting and recognizing handwritten information from legal instruments (e.g., checks).

2. Description of the Related Art

Typically, a check is made by a payer ($Pa(i)$) to a payee, or a recipient ($Re(j)$). The check is made on an account that the payer has at a bank ($Ban(Pa(i))$). This means that the check is drawn on the bank ($Ban(Pa(i))$).

Checks that arrive at a business as the recipient thereon are usually stamped on the back of the check by that business ($Bus(k)(=Re(j))$). The business will then deposit these checks at its bank ($Ban(Bus(k))$). It is possible that the business may use several different banks, so that the checks may be deposited in several different banks.

The business' bank ($Ban(Bus(k))$) regularly (e.g., in most countries, every working/business day) bundles together all of the checks that it receives and that are drawn on each individual bank. Then, the business' bank ($Ban(Bus(k))$) sends to the payer's bank ($Ban(Pa(i))$) all of the checks drawn from accounts on that bank. Therefore, the payer's bank receives the checks from a particular payee in batches or strings of checks.

The payer's bank ($Ban(Pa(i))$), may want to capture some information from these checks. Such data capture is difficult to perform quickly because most data added by payers on checks, such as payee's name, date, amount, comments, etc. is handwritten. Generally, it is difficult for a bank to capture handwritten information automatically from a check. Some payers use stamps to add payee data to a check. However, even stamps are often obscured by superimposed stamps or writings, and placed in ways which are often not systematic.

Most banks convert received checks from their analog form to a digital form, in particular to allow data to flow and to be stored, retrieved, etc., using electronic means of storage, search, communication, and other aspects of check handling. The information that the payer's bank or other entities may wish to obtain can be extracted from the checks, either when they are handled in paper form, or when they are transformed into an image.

Checks are very familiar objects to most adults in a country like the United States where they are still commonly used. The following description will be directed to checks from the United States. However most if not all of what is described applies equally to checks from most countries. FIG. 1 illustrates a front view of a standard American check and FIG. 2 illustrates a rear view of a standard American check. There are several distinctive fields on the check, which are described below.

Referring to FIG. 1, the MICRline (X) 101 is a relatively long number usually located on the bottom left of the front of the check. The MICRline 101 consists of the branch number, the account number, and the check number for that account. The check number 102 itself is repeated, usually on the upper right corner of the front of the check 100. The name and address 103 of the account owner (e.g., an individual or a company) is usually on the upper left of the front of the check 100. The name and address field 103 may also include a telephone number, and/or some other identifying numbers in the case of a corporation.

The check 100 also includes a number of different fields for writing or stamping additional information that is particular to the check being written. The fields for inputting information include the date that the check is written 104, the payee's name (individual or business) 105, the numerical amount (or courtesy amount) 106, and the written amount (or official amount) 107. Additionally, the front of the check 100 includes a signature field 108 where the payer signs the check 100. Also, the front of the check 100 includes a memo line 111, which is a field for the payer to write what the check is being used in payment for or to include any other pertinent information, such as an account number.

The front of the check 100 also provides information describing the payer's bank. Specifically, the front of the check 100 includes the name and address of the bank 109 and an identifying logo 110 of the bank. The check 100 may also include a notice 112 that the check is equipped with counterfeiting adverse features. Specific details of the features will be defined on the back of the check.

Referring to FIG. 2, the back of the check includes an area for the payee to endorse the check 1113. Also, the back of the check may include the specific details of the counterfeiting adverse features 114, as indicated on the front of the check (see 112), which includes instructions to reject the check if some of these features are compromised.

While most of the world is moving away from checks (although at a rather slow pace, about 4% decrease per year in England, for instance), the use of checks in the United States remains extremely high. In fact, even in countries where overall check traffic has been significantly decreased, there are businesses, which still handle an increasing number of checks. For example, in the United States in 1993, checks represented 80% of the non-cash transaction volume for only 13% of the transaction value, with an average value per transaction of $1,150. Hence, while the use of checks has been declining in some countries, it is still increasing in some.

Checks have been chosen as one example of documents that carry information that can be used for purposes other than the intended use of the document carrying the information. Some of the potentially useful information written on a check (taken as an example of a document) is handwritten by a person whose handwriting is unknown, (or poorly printed) in the sense that automated recognition has not been trained on it. The typical handwriting on a check is so badly written that current image recognition machines cannot decipher the content, nor is it expected that the next few generations of machines will be able to decipher the content.

As shown in FIGS. 1 and 2, at least a portion of the handwritten or stamped information provided on the check refers to the payee of the check. It is often important for the payer bank to track to whom its customers are writing checks.

Currently, the conventional processes for information extraction typically use either manual, human extraction methods or pure image recognition procedures. The manual, human extraction methods involve actual human, visual review of the checks, which is extremely slow and inefficient. The pure image recognition procedures, while automated, are extremely inaccurate. Indeed, some of these procedures provide approximately less than thirty percent accuracy rates. Furthermore, there are no conventional information extraction processes that are directed to extracting payee information from a check.

Furthermore, the average volume of incoming checks to a bank cannot be managed by the conventional methods. That is, the average volume of incoming checks for a bank is the range of millions of checks per day. The inefficient, often human-based, conventional methods cannot manage this large of a volume.

Additionally, because of the large number of checks that need to be analyzed each day, a bank using one of the conventional methods will typically have a large number of employees processing the checks. The large number of employees handling causes reduces the privacy provided to the bank's customers as well increases security risks.

SUMMARY OF THE INVENTION

In view of the foregoing and other exemplary problems, drawbacks, and disadvantages of the conventional methods and structures, an exemplary feature of the present invention is to provide a method and system in which a bank or other party may extract information from a document (e.g., a check in an exemplary non-limiting embodiment) that is possibly not designed to convey such information to a party that handles and possesses the document.

It is another exemplary feature of the present invention to provide a method and system that allows a payer bank to automatically extract information directed to the payee of a check from checks drawn on the payer bank.

In a first exemplary aspect of the present invention, a method for extracting information from a document, includes segregating a set of documents from a plurality of documents based on a likelihood that at least one document in the set of documents carries an instance of a preset information.

In a second exemplary aspect of the present invention, a system of extracting information from a document, includes a segregation unit that segregates a set of documents from a plurality of documents based on a likelihood that at least one document in the set of documents carries an instance of a preset information.

In a third exemplary aspect of the present invention, a system of extracting information from a document, includes means of segregating a set of documents from a plurality of documents based on a likelihood that at least one document in the set of documents carries an instance of a preset information, and means for interpreting results obtained from the means for segregating a set of documents.

In a fourth exemplary aspect of the present invention, a signal-bearing medium tangibly embodies a program of machine readable instructions executable by a digital processing apparatus to perform a method for extracting information from a document, where the method includes segregating a set of documents from a plurality of documents based on a likelihood that at least one document in the set of documents carries an instance of a preset information.

In a fifth exemplary aspect of the present invention, a method for deploying computing infrastructure, includes integrating computer-readable code into a computing system, wherein the computer readable code in combination with the computing system is capable of performing a method for extracting information from a document including segregating a set of documents from a plurality of documents based on a likelihood that at least one document in the set of documents carries an instance of a preset information.

The exemplary method (and system) of the present invention recognizes and extracts handwritten (as well as stamped or printed) information on documents. The exemplary method of the present invention may be used to extract information from any type of document, including, but not limited to, original paper documents, photographic representations of documents, digital representations of documents, or a combination of original documents and representations or documents. Checks are an example of documents that are handled in massive quantities by some parties. Hence, in an exemplary embodiment, the present invention is directed to extracting information from checks. It should be clear, however, that the present invention is not limited in its scope to these financial instruments, and the invention can be used as well for other forms of documents and contracts that carry handwritten information, or prints of quality too poor to be exactly readable. The techniques of the present invention may also be extended for use to extract other human readable information such as voice recognition, speaker identification, etc.

In respect to the present description of the inventive method and system, "segregation of features" is defined as isolating, from a large (e.g., in the range of millions of checks per day) set of objects, a group of objects that presents the most likely matches to predetermined patterns in contexts where complete pattern recognition is considered to be too hard or too costly. Complete pattern recognition is too difficult to obtain because it is too difficult to recognize 100% of the checks in such a large body of checks (e.g., millions per day).

For example, a bank may receive a batch of 8,000 checks, where 3,000 of the batch of checks are written to a specific payee. Every check written to the specific payee will include at least one (in most cases a plurality of) characteristic or feature that is particular to the specific payee. This at least one characteristic is known to the bank. The predetermined patterns include this at least one characteristic. The segregation method of the present invention locates all of the 3,000 checks written out to the specific payee by segregating each check including characteristics or features that match the predetermined pattern.

An important principle of this invention is that even if reading information is difficult, either because it is handwritten by someone whose handwriting has not served as a training ground to a handwriting recognition algorithm (i.e., an unknown writer) or printed with poor quality, a bank may still recognize, out of a large set of documents, N documents, which are the M ($M \leq N$) documents in that set most likely to carry the sought patterns (e.g., written text, stamped text, typed text, printed text, logos, etc.).

That is, document segregation is a method for recognizing out of N documents, the set M of the documents most likely to carry some predetermined text T, or one of the predetermined texts in a list of T1, T2, . . . , TL of L distinct texts. The present invention shows that document segregation can succeed in extracting information from a document even where text recognition would mostly fail. The present invention also provides a way to improve reading capabilities in the context of special documents, such as checks, using their special features, as it is clear that better text reading will improve text segregation.

With the above and other unique and unobvious exemplary aspects of the present invention, it is possible to optimize the extraction of information from documents for various applications.

BRIEF DESCRIPTION OF THE DRAWINGS

The foregoing and other exemplary purposes, aspects and advantages will be better understood from the following detailed description of exemplary embodiments of the invention with reference to the drawings, in which:

FIG. 4b illustrates an exemplary flow chart of a method 410 for extracting information from documents by document segregation according to a second exemplary embodiment of the present invention;

FIG. 7 illustrates an exemplary hardware/information handling system 700 for incorporating the present invention therein; and FIG. 8 illustrates a signal-bearing medium 800 (e.g., storage medium) for storing steps of a program of a method of the present invention.

DETAILED DESCRIPTION OF EXEMPLARY EMBODIMENTS OF THE INVENTION

Figure 1:
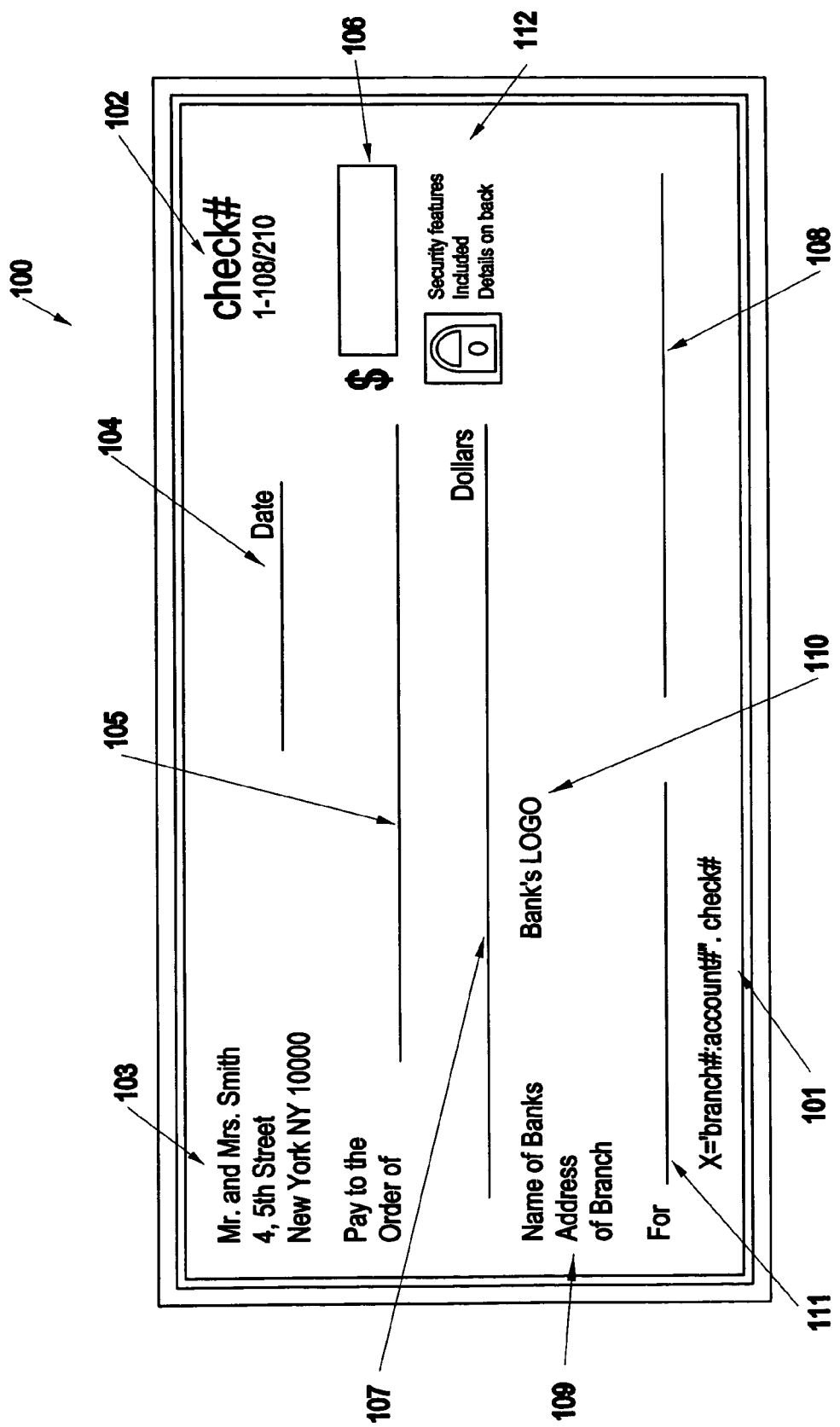
FIG. 1 illustrates a front view of an exemplary American check 100.

Referring now to the drawings, and more particularly to FIGS. 3-8, there are shown exemplary embodiments of the method and structures according to the present invention.

As mentioned above, the method and system of extracting information from a document-by-document segregation of the present invention is exemplarily described below in the context of checks, where handwriting is a typical example of a human readable source and the checks are an example of documents from which information is automatically extracted. However, the method and system of the present invention may be applied to any human readable source and any document carrying such human readable source. For purposes of the present invention, the term "check" is specifically directed to personal checks. However, it may also include traveler's checks, bank checks, certified checks, money orders, coupons, receipts, remittance documents, etc.

Figure 3:
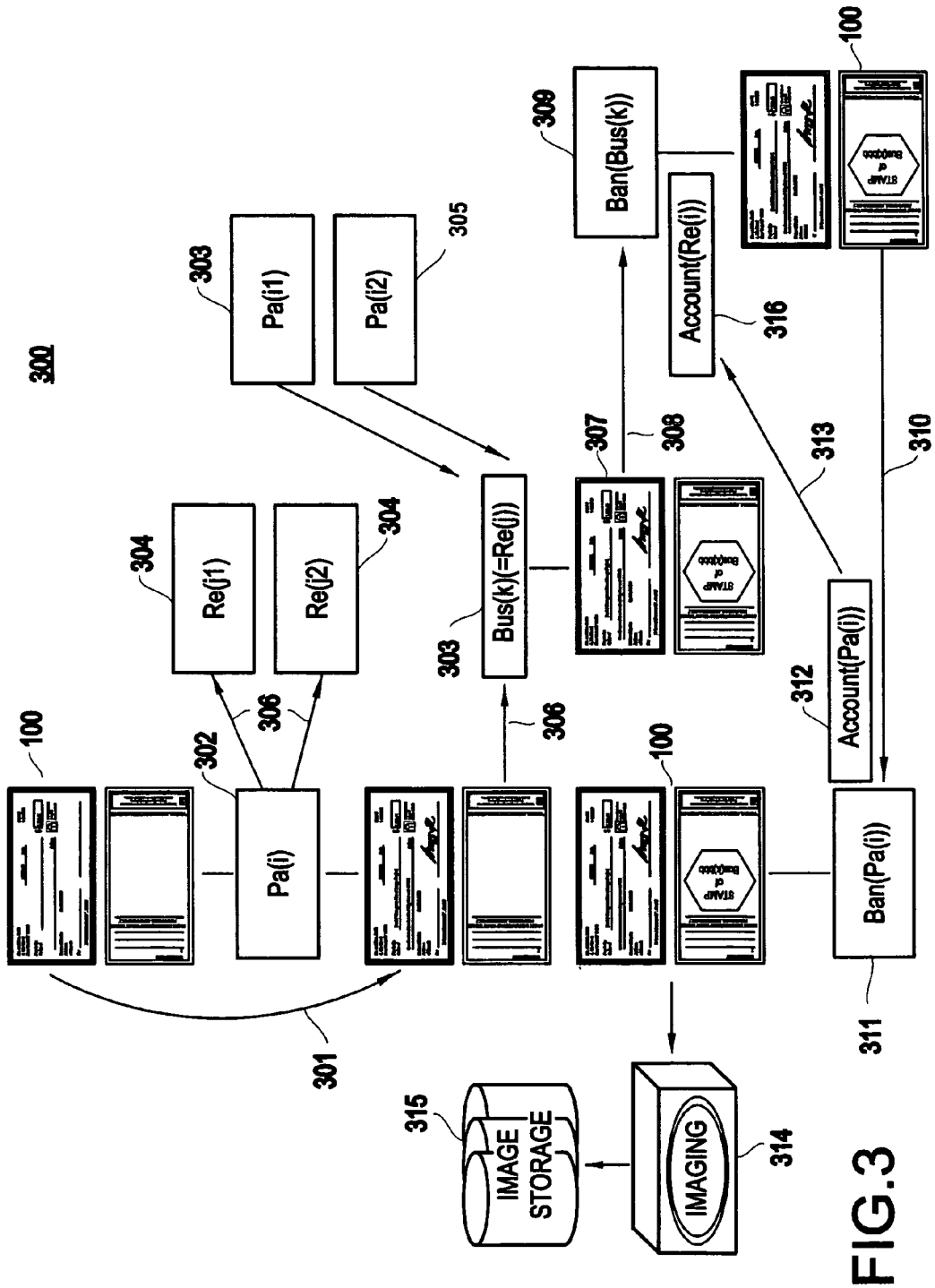
FIG. 3 illustrates an exemplary flow chart depicting the path of a check 100 through a typical bank check processing procedure 300.

FIG. 3 depicts a typical path of a check 100 after it is written and used as payment by a payer. The payer (Pa(i)) 302 writes the check 100 by filling in the date, the amount and the payee information (301).

Once the check 100 is written and signed, the payer 302 gives the check to a recipient (Re(j)) (306). The recipient may include one of an individual recipient 304 (Re(j1) or Re(j2)) or a business recipient 303 (Re(j)/Bus(k)). In the case of the business recipient 303, several payers 305 may be sending payments to the recipient 303.

The recipient 303, 304 endorses or stamps 307 the back of the check 100 and deposits (308) the check at its bank 309 (Ban(Bus(k))). As stated above, in the case of a business recipient 303, the recipient may be depositing checks into one or more accounts located in one or more banks. The recipient's bank 309 transfers (310) the check 100 to the payer's bank 311 (Ban(Pa(i))) against payment, i.e., money transferred from the account of the payer 302 at the payer's bank 311 to the account of the recipient 303, 304 at the recipient's bank 309.

Once the payer's bank 311 receives the check 100 from the recipient's bank 309, the payer's bank 311 checks the payer's account 312 for sufficient funds and then transfers the amount of the payment (313) from the payer's account 312 to the payee's account 316. The payer's bank 311 then processes the check 100 using an image processing procedure 314 to extract information from the returned check 100 and stores the extracted information in an image storage database 315.

As discussed above, the conventional image processing procedures are limited as to their efficiency and as to the type of information that they can extract from the returned checks. Typically, the conventional image processing procedures only extract information concerning the payer, which is printed on the check, and information regarding the recipients' bank. Conventional image processing techniques cannot accurately extract handwritten information from documents.

In contrast, the present invention provides a method (and system) for extracting information from documents by document segregation that allows a bank to automatically, efficiently and accurately extract information from a check, including handwritten or stamped payee information. As mentioned above, the discussion of the present invention is exemplarily directed to checks, however, the method and system of the present invention may be used for extracting information from any information-containing document.

Certain exemplary embodiments of the present invention are directed to handwriting recognition, but it is known that printed text, and in particular printed text with known characters, and with known characters and known printing devices, is considerably easier than handwriting recognition. The exemplary embodiments described below will be directed to off-line (e.g., after the handwriting has been written on the document) handwriting. However, it should be clear to anybody versed in the arts of machine learning that the present invention, which is directed to isolating the most likely matches to predetermined patterns in contexts where complete pattern recognition is considered to be too hard or too costly, can be used as well for on-line handwriting recognition or other types of pattern recognition. Other types of exemplary pattern recognition include, but are not limited to, speech recognition, speaker identification and other biometric measurements, etc.

Figure 4A:
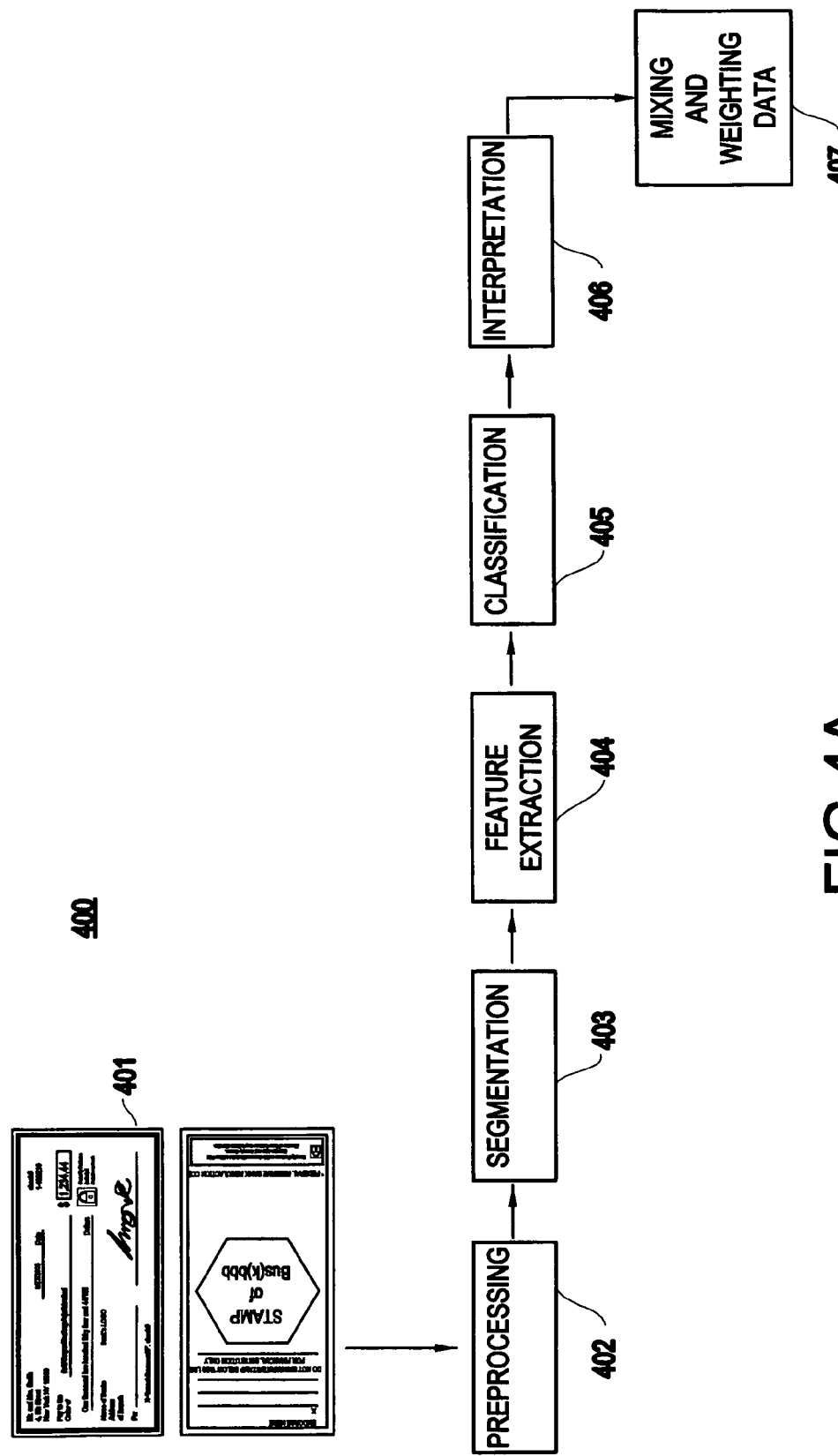
FIG. 4a illustrates an exemplary flow chart of a method 400 for extracting information from documents by document segregation according to a first exemplary embodiment of the present invention.

There are several steps involved in the document segregation method of the present invention. The steps of the present invention will be described in the particular context of handwriting recognition for extracting handwritten information from a check 401. FIG. 4a depicts an exemplary method 400 of the present invention. The method 400 includes preprocessing 402, segmentation 403, feature extraction 404, classification 405, and interpretation 406.

In preprocessing 402, the check 401 is scanned and the scanned image of the check 400 is then altered. Altering the scanned image may include geometrical transformations such as rotation correction, filtering the check image to eliminate noise, background separation and elimination, etc.

Segmentation 403 may include geometrical analysis to identify the various fields of interest of the scanned checks 401. Each check written to a certain payee will include various characteristics specific to that payee. For example, each check written to a specific payee will include the payee's name written on the front of the check 400, as well as the payee's endorsement signature or a specific stamp on the back of the check 400. Additionally, checks written to the same payee may also include a specific message written in the memo line (see FIG. 1, 111) of the check 400 that is consistent with other checks written to the same payee. These features or fields are considered to be the features or fields of interest. Segmentation 403 analyzes the checks to identify these fields in each of the scanned checks.

The feature extraction 404 isolates the relevant properties or patterns of the predetermined objects to be recognized on the check.

The classification 405 determines which checks should be included in the set of checks most likely to have a specific information feature. The classification 405 determines if some characters or words on the check belong to a certain class of checks.

The interpretation 406, using the context of the search, attaches the characters and words to the element of the text.

The segregation method 400 obtains information and characteristics from each of the previously described steps. The information is then mixed and the weight applied to each characteristic is then adjusted (step 407). For example, the weight may be adjusted based on the level of consistency of a given field. More weight will be assigned to a field that is more consistent then the other fields being analyzed.

As stated above, the payer bank receives returned checks from the payees in batches. Therefore, in the total set of returned checks there will be strings of adjacent checks that share the characteristics that are particular to the specific payee. Thus, finding the same characteristic information of a specific payee in adjacent checks would lead to a conclusion that the payee is the same on both checks. Since the bank knows that checks from a particular payee arrive batches, the recognition is made easier.

The segregation method of the present invention uses at least one of a variety of methods for preselecting a likelihood that a given pattern (or information feature) on a check matches the preset pattern being searched for by the bank.

The variety of preselection methods includes, but is not limited to, using more rudimentary pattern recognition (at a coarser level) to have one segregation of the likelihood, using special aspects of the handling of the object that serve as support of the features to be segregated to collect one or more segregation's (possibly each of low quality) of the likelihood on individual objects (e.g., the preset pattern serves to identify a special recipient of checks and the recipient puts some mark such as a stamp on the checks), and using special aspects of the handling of the object that serve as support of the features to be segregated. For example, when groups of objects to be segregated are known to be formed or suspected to be formed during the handling by other parties, then possibly interfering with the handling without acting of the third parties. In such a case, special support items that carry more recognizable instances of the predetermined feature are introduced in the collection of objects.

The special support items can then serve as markers and can be used to verify the existence of groups, the bounds of the groups, if there are such groups, and the objects are linearly ordered, when the groups to be segregated are bundled.

Additional preselecting methods include, using the fact that one has some knowledge of how many objects carry the preselected feature, or approximate knowledge of this number, using parts of the features on the objects that may be more recognizable to provide some training from the analysis of those features (e.g., on the handwriting of the writer in the case of handwriting recognition; in the case of checks, one can use amount reading as a training ground, since the coexistence of legal and courtesy amount fields simplifies recognition, and the amounts must be captured anyway), assuming in said training that some identification of the writer (or more generally pattern creator) can be obtained so that further training can be obtained if other objects from the same originator are available, assuming in the training that for the given writer the same word (e.g., Name of the beneficiary) is likely to be written in the similar manner in order to monitor checks written by the same person (account holder) to the same beneficiary, using analysis of the time in which checks were written and deposited in order to increase the likelihood of correct check identification, using timing analysis (as explained above) based on interdependencies between different checks written by the same person, using reverse markers (i.e., if one is interested in checks written to company A then checks identified as written to companies other than A would serve as reverse markers), using a combination of automatic and manual methods, where some automatic systems choose a small number of objects to be analyzed manually so that the final segregation of a large number of items is possible by combining the automatic and manual results, and/or using geographical information to find the customers of a specific company (e.g., utility), when one knows that this company operates in some specific regions.

A party can also then utilize the information about the name of the company as an additional training ground for each customer's handwriting recognition, using the courtesy amount to increase the likelihood (e.g., for a given individual, one can expect payments to a specific business to be in a certain dollar/currency range). As another example, all checks that are below a pre-specified amount can be discarded.

FIG. 4*b* illustrates another exemplary embodiment of the method for document segregation 410 according to the present invention. The method described in FIG. 4*a* included a single, serial chain of steps.

That is, the method included only a single iteration of preprocessing 402, segmentation 403, feature extraction 404, classification 405, and interpretation 406. In the embodiment depicted in FIG. 4*b*, however, the segregation method 410 includes two separate process chains 420, 430.

The segregation method 410, however, is not limited to using either one or two chains, and a plurality of chains, including any suitable number of chains, may be used in parallel in order to extract different features from the checks. For instance, it is useful to use multiple classifiers that may utilize different features, as in one simple case when both character and word classifiers are used and the interpretation uses confrontation of both classifications. This specific case is illustrated in FIG. 4*b*.

The segregation method 410 includes a character recognition chain 420 and a word recognition chain 430. The character recognition chain 420 extracts information regarding specific characters (e.g., letters in a word) that appear on the check 411, while the word recognition chain 430 extracts information regarding specific words that appear on the check 411. It is advantageous to use multiple chains to gain more information and to increase the accuracy of the results obtained by the segregation method 410.

The segregation method, however, is not limited to only one chain or two chains as provided in FIGS. 4*a* and 4*b*, but may include a plurality of chains. In addition to word recognition 430 and character recognition 420, the segregation method 410 may also include, for example, geometrical analysis of images on the check. The images on the check may include stamps on the back of the check, printed information, etc.

The character recognition chain 420 includes preprocessing 421, segmentation 422, feature extraction 423 and classification 424 as described above regarding FIG. 4*a*. The word recognition chain 430 also includes preprocessing 431, segmentation 432, feature extraction 433 and classification 434. During the method 410, all pertinent fields on the check are simultaneously examined for preset patterns or information, as opposed to only analyzing a single check field at a time.

The segregation method of the present invention obtains information from each step in the method. Once the information is obtained from each of the preprocessing, segmentation, feature extraction and classification steps of each of the character recognition chain 420 and the word recognition chain 430, all of the information is combined and subjected to interpretation 440.

As stated above, the bank will have certain known information about the preset payee, such as features that are particular to the specific payee, as well as the number of checks including the specific payee information. Once the information is obtained extracted using the steps described above, it is mixed with the known information about the preset payee to obtain a desired set of checks. As described above, when the obtained information is mixed with the known information the weight adjusted to each of the obtained information is adjusted, depending on the parameters of the particular search.

Once the desired set of checks is obtained, the payer bank may conduct improved and more thorough data mining to learn information about the particular payee.

The segregation method of the present invention provides various means to extract as much desirable information as possible out of a check, or other document. As described above, the method of the present invention utilizes all pertinent fields of the check (or other document) to extract information. The careful use of all knowledge about a well-formatted class of documents or other information carrying objects, such as contracts of some definite form, can be used to extract information that may be useful, either directly, or to improve the performance of automated segregation of objects that carry preselected patterns in that class of documents.

The segregation method also applies to other pattern recognition contexts where segregating a pattern can be simpler than the relevant general pattern recognition technology problem, especially if auxiliary means of segregation are invoked and some proportion of either false positives or false negatives or some proportion of both is considered as not significant. That is, most applications in which the segregation method is used are not highly sensitive to false positives and false negatives. For applications having increased sensitivity, however, the false positives and false negatives may be minimized.

One of the important steps in the handling of checks is that the payer bank knows the dollar amount on each check written by one of its payer customers. This amount usually appears on two fields 106, 107 of the check 100 (see FIG. 1). The amount is written in numbers in the numerical amount field 106, which is usually easier to read, and is also provided in words in the written amount field 107. The amount is often seized by human agents and is attached to the check in a machine-readable form. The text on written amount field 107 can then be used as a small, but not insignificant, training ground to better recognize what could occupy the payee's name field 105. That is, the character/handwriting recognition unit could train on this field of the check to determine characteristics of a customer's handwriting, prior to examining the handwritten payee field.

Besides, using the exponentially decreasing price of storage combined with improved storage handling, all checks by payer Pa(i) (or at least many of them) can be conglomerated so that all amounts together form a training ground that may significantly improve the readability of the payee name field 105 on all or most checks written by the payer.

Another means for extracting information from the set of documents includes using auxiliary fields on the document. For example, such auxiliary fields may include memo field, endorsements, bank stamps, name and address field, MICR-line, etc.

Again referring to FIG. 1, each check 100 includes a memo field 111, which is used to provide a description for what the check 100 is in payment. The description could include, for example, an account number, in the payment to utilities or to some other types of special accounts. Such account numbers are well-formatted depending on what they refer to, and the bank will be able, in some cases, to glean significantly better what is included in the payee name field 105 using the information extracted from the memo field 111.

The auxiliary field (in this case the memo field 111) either carries information that may not be sufficient by itself but may aid in determining the content of the main field (in this case, the payee name field 105) or carries information which, although it is possibly much less significant than the information included in the main field when out of context, may become fully sufficient when used in a specific, predetermined context. For example, the set of numbers in the memo field 111 may clearly signify that the check was written to an identifiable party. This information can also serve to preselect checks that are potentially good candidates to carry the preset recipient (payee) in the payee field 105.

Figure 2:
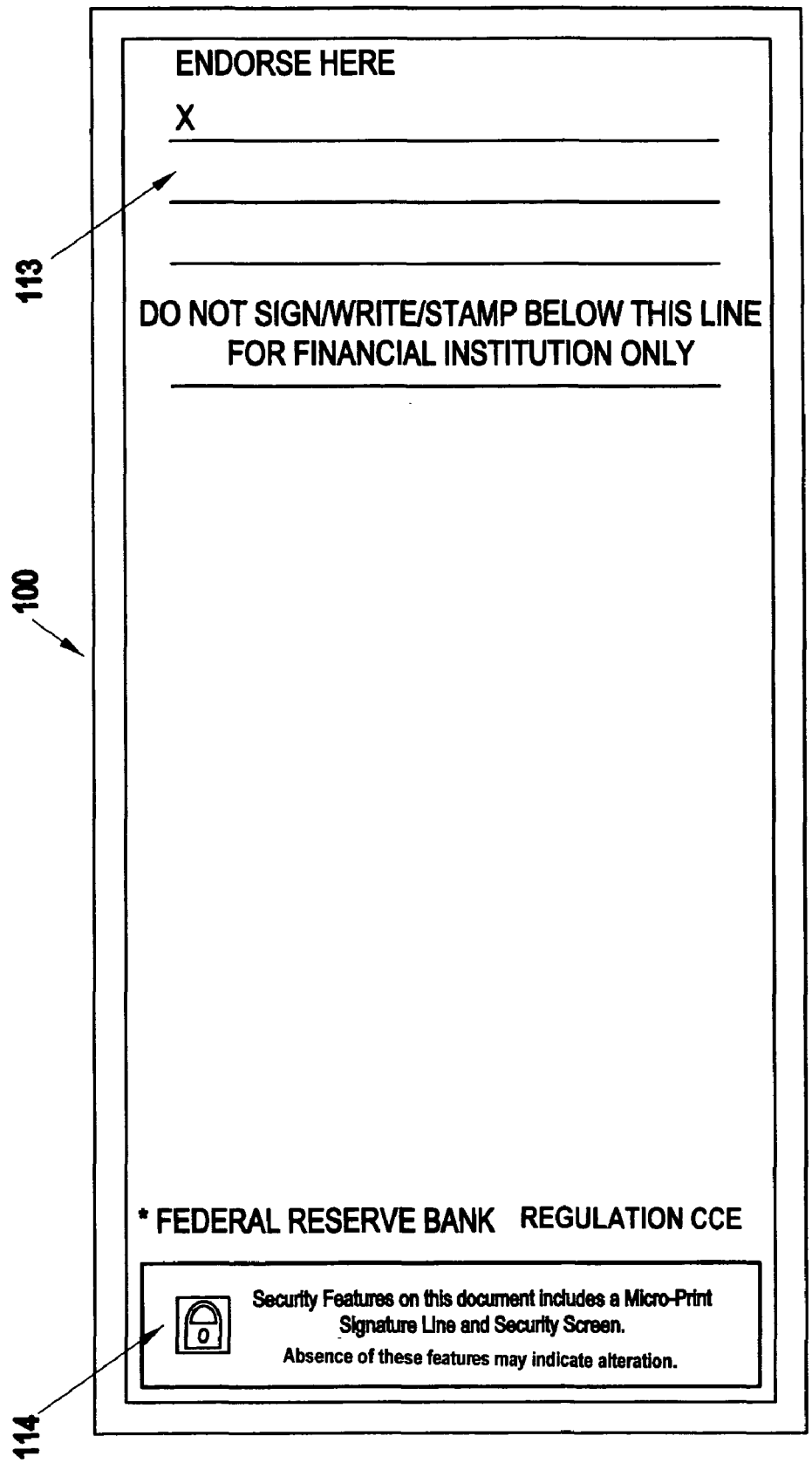
FIG. 2 illustrates a rear view of an exemplary American check 100.

Referring to FIGS. 2 and 3, a business recipient 303 (Bus (k)) receiving a check 100 may append its stamp to the back of the check (and in general then endorse that check to the recipient bank 309 (Ban(Bus(k))) where the check is deposited). Although the recipient's stamp on the back of the check 100 may have poor readability by the time the check 100 arrives at the payer's bank 311, the information in this supplementary field can also be used to better select the check 100 as one of the checks that is addressed to the specific payee. It is noted that the handling of the check 100 by the recipient bank 309 may obscure the stamp appended by the recipient 303 on the back of check 100. However, the blurring may be due to a stamp by the recipient bank 309, and that stamp may help preselect the check 100 as being written to the preset payee.

Therefore, several aspects of document handling may generate a variety of indications that may help in determining which documents have a higher likelihood of being included in the segregated class. It is an important feature of the present invention that the segregation method automatically and concurrently analyze a plurality of the fields on a check, as opposed to the conventional methods, which merely analyze a single field at a time.

One of the various extraction means that illustrates the difference between conventional pattern recognition and pattern segregation is "smearing". Smearing is a technique that is used to replace the connected components of a written word by the simply connected sets that contain these components. In typical text recognition, smearing is often used as a pre-processing step, for instance to determine base lines and set some parameter to map the words on a more standard format.

In the segregation method of the present invention, one may use the count of maxima and of minima, respectively, of the upper and lower lines of the smears, or of the words themselves, either as one of the indicia of recognition, or as the sole recognition criterion in cases when the number of acceptable positives and negatives is large.

Figure 5B:
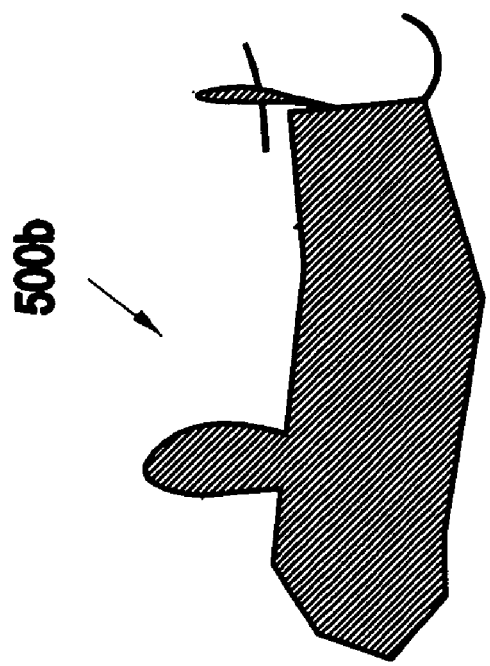
FIG. 5 illustrates an example of a smearing technique used for a handwritten word 500a on a document.
Figure 5A:
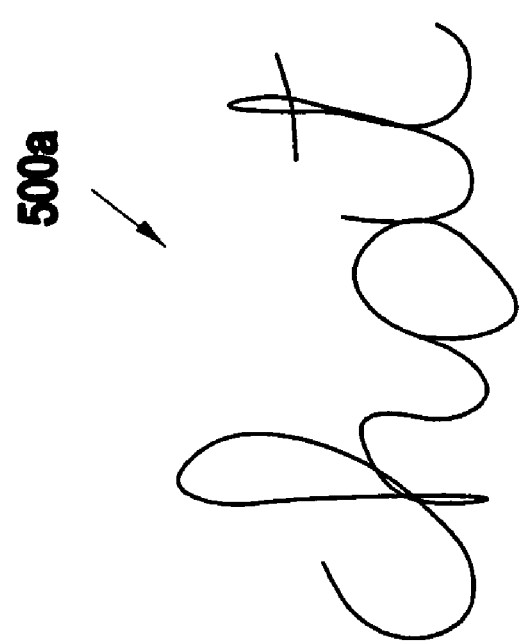

FIGS. 5(a) and 5(b) depicts an example of smearing of the word "chat". That is, FIG. 5(a) depicts the word "chat" 500a, while FIG. 5(b) depicts a smearing 500b of the handwritten occurrence of the word "chat" 500*a* depicted in 5(*a*). The smearing includes two significant maximums 500*c* and 500*d* and no significant minimums. The maximums are the high points included in the word. For example, in FIG. 5, the two maximums include the peak of the letters "h" and "t" in "chat". The minimum includes a low point of a letter in a word. For example, the letters "y", "p" or "q" would all include a minimum that could be used to identify the word.

There are several different exemplary situations in which the document segregation method may be used. The exemplary situations include a general case; where N>>M (M is mostly unknown otherwise); where M is known (or approximately known); where N>>M and M is known; where the N documents are ordered, and the M documents sought form one or more consecutive series, as well as several combinations of the above listed situations. A detailed description of each exemplary situation is provided below.

Example 1

The General Case

The number of indicia (e.g., the number of fields of which information was obtained) that may have been collected using the segregation method determines the amount of work needed to be done (e.g., mixing obtained information with known information, adjusting weight of information, etc.) to determine the actual likelihood that the payee name field 105 carries text T (or one of T1, T2, ..., TL texts). That is, as the number of fields being used increases, the amount of necessary work will increase as well. A list such as T1, T2, ..., TL may arise instead of a single text T because some payers may write the name of a payee differently then other payers, because of abbreviation, or other variations or mistakes.

For example, if the payee to be located was Continental Edison, the payers may write "ConEdison" or "Con Edison" or "ConED" instead of the full "Continental Edison" in the payee field 105. Sub-lists of this type can be treated as independent runs of text Ti, ..., Tj but this solution is largely sub-optimal if one has an estimate of M for the whole of (T1, T2, ..., TL), and poorer estimates of the numbers for all renderings of such sublists.

Example 2

Where N>>M

In situations where the number of total documents N is much greater than the number of documents M most likely to carry some predetermined text or pattern, it is possible to classify an object by a binary output, say in {0,1}, while one knows there are much more 1's than 0's.

Example 3

Where M is Known or is Approximately Known

In the case where M is known or is approximately known (e.g., in advance of processing), the very fact that one knows M allows the bank to more easily select the segregated subgroup as the bank chooses some number M' close to M (smaller or larger depending on application, e.g., depending on which choice is better according to some Return On Investment (ROI) criterion) and then selects the M' samples most likely to be matches. Knowing M in advance establishes a target number, thereby allowing search characteristics/features (and refining such search characteristics/features) which would generate M' documents which are in number relatively the same or close to M documents.

Example 4

Where N>>M and M Approximately Known

In the situation where N is much greater than M and M is also known, or approximately known, a bank can obviously combine the advantages examples 2 and 3 listed above.

Example 5

Where the N Documents are Ordered, and the M Documents Sought Form One or More Consecutive Series In the case where the M documents form one or more consecutive series, the analysis is simplified because two consecutive probable matches of patterns, when compared to the preset pattern, are more likely to be both correct or both incorrect. That is, knowing in advance that the N documents are ordered (in batches), the user having two consecutive probable matches increases the likelihood that they will both be correct or both be incorrect. The likelihood that the two consecutive probable matches will be either correct or incorrect improves as the length of the series increases. Thus, if the length of the series is 3,000 documents (as opposed to 10 documents) the likelihood of consecutive probable matches will increase.

The presence of one or more very recognizable positive matches greatly improves the performance of the segregation method, at least as long as one can trust that batches of documents sharing similar patterns or text have been formed. This good match, or marker, can be introduced by the bank, even without the complicity of a third party.

That is, in the case of checks, the payer bank could make several payments of a small amount to the recipient(s) that the bank is seeking (recall that there may be several patterns one seeks, but that they are treated one by one, at least logically if not effectively). Sending a marker would facilitate the reading (as one could expect that the other positive matches form a segment that contains the marker) and sending several markers would be of increased value.

Special actions may be needed to increase the likelihood of an even distribution of the markers such as staggering them in time, and varying source locations. A training period may also be required. A significant departure from a good distribution in a segment would be an indication that the hope of the existence of a batch of checks has been deceived. That is, there has been no batch processing. For example, there may be an average number P of non-markers between two markers, and if n0 and n1 are the positions of the first and last markers, the batch of positively matching checks can be taken as slightly larger than the segment [n0−P,n1+P], for example [n0−P−kD, n1+P+kD], where k can be chosen by management and may depend on the preselected pattern, or could be fixed at 1 or 2 once and for all, and D is the variance of the distribution of length segments between markers.

Whether there are markers in the object series, the influence of the neighbors can be caught by using the context sensitive likelihood level L(i) which can be defined as:

$$L(i)=l(i)+\Sigma_{j=1,\ldots,k}a(j)l(i-j).$$

or by similar formulas, where the weights a(j) can be determined by training in advance. Typically, k will be of the order of expected length of the batches of checks and the weights will be decreasing functions of j, for instance $a(j)=2^{-j}$.

The above techniques can be used when grouping of the desired objects is expected to occur, but one does not know that the groups will be perfect (e.g., in the context of the invention, "perfect" means it is a group of checks of the desired type (e.g., including specific payee information) having no false positives and no false negatives), either because of possible accidents in manipulation or, for systematic reason. In the (improbable) case when one is sure that there will be perfect groups, it may be economical to test for endpoints of the groups. For example, assuming there are 3,000 objects and it is believed that such 3000 objects are in the group, it may be advantageous to search for the endpoints (e.g., object 0001 and object 3,000).

As a further example, testing for endpoints may include:

1) Starting from the beginning of the file, one obtains a first effective start point by the first significant surge of l(i), say the first i, say i(L1) such that l(i(L1))>0.7 but l(i(L1)−1) at most 0.7 (one can use some confidence level T other than 0.7).

2) Starting from the end of the file, one gets the last effective end point by the first significant surge of l(i), say (going down indices) the first i, say i(R1) such that l(i(R1))>0.7 but l(i(L1)+1) at most 0.7 (again, one can use some confidence level T other than 0.7).

If a bank knows approximately M, and i(R1)−i(L1) is substantially equal to M, the "good" group (e.g., the group of interest) extends from L1 to R1. In fact one can use the knowledge of M and an estimate on L1 to guess R1. Otherwise, one picks a point K1 between L1 and R1:

If l(K1) is not greater than T, the bank sets K1e=K1,

If l(K1)>T, the bank picks another point at random until the bank obtains a point M1e with l(K1e) is not larger than T.

The bank now has two lists, one from the beginning of the initial list to K1e, the second from M1e to the end of the initial list, and the bank can iterate the whole process until either the total of the lengths of the groups is about M, when M is approximately known, or the random sampling cannot find a point j with l(j) not above T after some number, say 5, of trials. It is noted that a plurality of lists (e.g., 2, 3, 4, etc.) could be used by the bank depending upon design requirements and constraints.

This exemplary method proves the feasibility of using endpoints. However, other sampling methods could be used.

Figure 6:
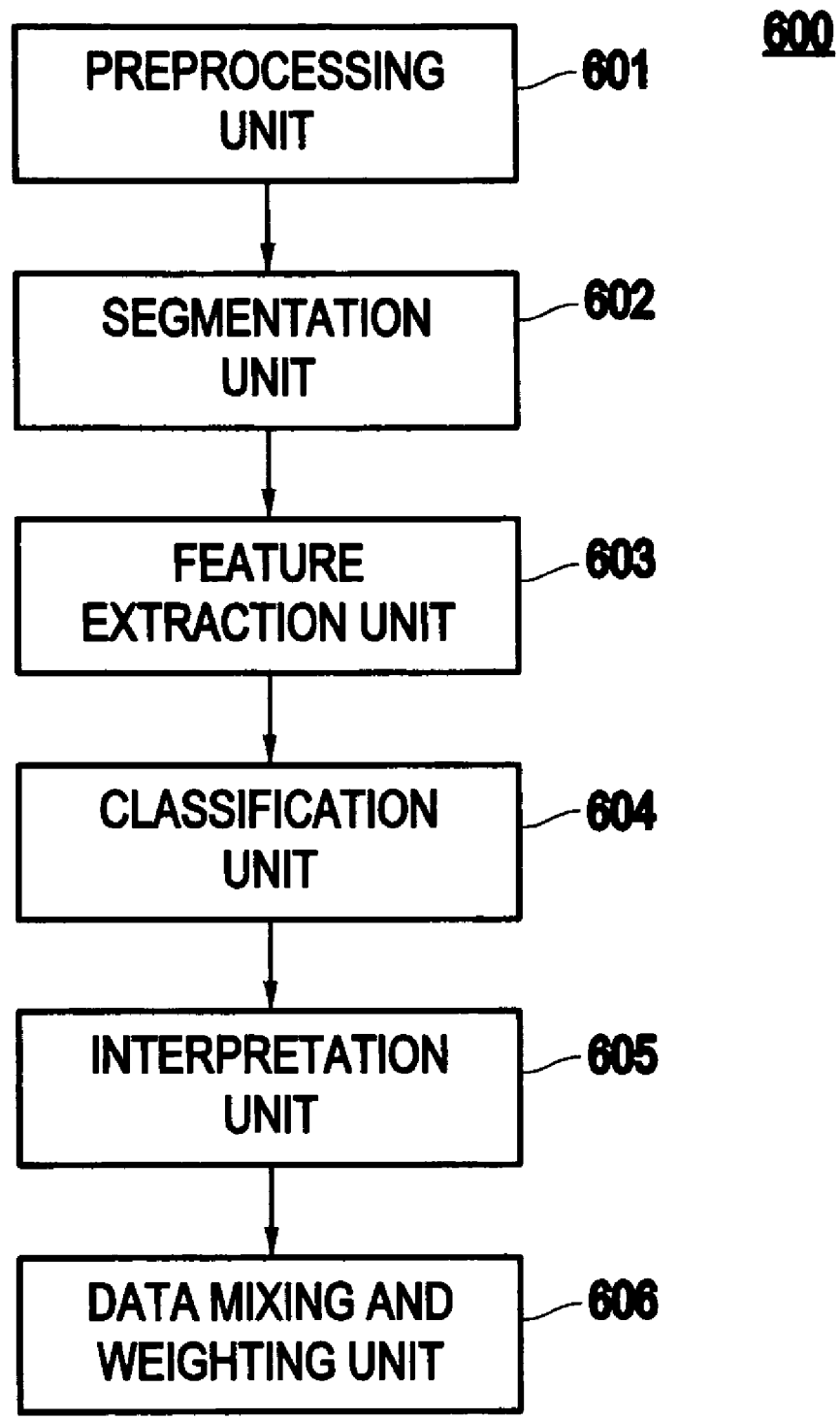
FIG. 6 illustrates an exemplary computer system 600 of extracting information from documents by document segregation according to the present invention.

FIG. 6 depicts an exemplary computer system 600 for extracting information from documents by document segregation, according to an exemplary embodiment of the present invention. The system 600 includes a preprocessing unit 601, a segmentation unit 602, a feature extraction unit 603, a classification unit 604, an interpretation unit 605 and a data mixing and weighing unit 606.

The preprocessing unit 601 scans the check 100 and alters the scanned image of the check 100. Altering the scanned image may include geometrical transformations such as rotation correction, filtering the check to eliminate noise, background separation and elimination, etc.

The segmentation unit 602 uses geometrical analysis to identify the various fields of interest of the checks.

The feature extraction unit 603 isolates the relevant properties or patterns of the predetermined objects to be recognized on the check.

The classification unit 604 determines which checks should be included in the set of checks most likely to have a specific information feature. The classification unit 604 determines if some characters or words on the check belong to a certain class of checks.

The interpretation unit 605, using the context of the particular search, attaches the characters and words to the element of the text.

The data mixing and weighing unit 606, combines the data obtained from each of the above-described units with information known, including information learned in past experiences, to the bank prior to the search. Once the information is combined, the data mixing and weighing unit 606 adjusts the weight assigned to the information.

FIG. 7 shows a typical hardware configuration of an information handling/computer system in accordance with the invention that preferably has at least one processor or central processing unit (CPU) 711. The CPUs 711 are interconnected via a system bus 712 to a random access memory (RAM) 714, read-only memory (ROM) 716, input/output adapter (I/O) 718 (for connecting peripheral devices such as disk units 721 and tape drives 740 to the bus 712), user interface adapter 722 (for connecting a keyboard 724, mouse 726, speaker 728, microphone 732, and/or other user interface devices to the bus 712), communication adapter 734 (for connecting an information handling system to a data processing network, the Internet, an Intranet, a personal area network (PAN), etc.), and a display adapter 738 for connecting the bus 712 to a display device 738 and/or printer 739 (e.g., a digital printer or the like).

As shown in FIG. 7, in addition to the hardware and process environment described above, a different aspect of the invention includes a computer implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the present invention.

This signal-bearing media may include, for example, a RAM (not shown) contained with the CPU 711, as represented by the fast-access storage, for example. Alternatively, the instructions may be contained in another signal-bearing media, such as a magnetic data storage diskette or CD-ROM disk 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc,), or other suitable signal-bearing media including transmission media such as digital and analog and communication links and wireless. In an illustrative embodiment of the invention, the machine-readable instructions may comprise software object code, compiled from a language such as "C", etc.

Additionally, it should also be evident to one of skill in the art, after taking the present application as a whole, that the instructions for the technique described herein can be downloaded through a network interface from a remote storage facility.

The segregation method (and system) of the present invention may be used in other contexts, outside of the context of checks. For example, the segregation method may be used for text recognition, voice recognition, image recognition, speech recognition, and speaker identification, etc. instead of handwriting recognition and optical character recognition.

That is, a company might be interested in prescreening its customers to identify customers having similar attributes. The company would search some preselected feature in phone conversations between the company and its customers. Pure machine speech recognition, which is used conventionally, is not efficient enough for being even close to providing 100% exact transcription in the context of conversations for large sets of speakers and with no training of the machine learning the different speakers.

According to the present invention, the company could isolate (identify) the customers that it seeks using a combination of pure speech recognition techniques, speaker identification techniques, the duration of the conversation as compared to the duration of other phone conversations (or to the duration of other phone contacts with that customer), the pitch of the customer as compared to her or his usual pitch, the length of the customer interventions, special answers of the company (to be compared to the markers used according to this invention), etc.

Additionally, the segregation method or the present invention may also be used in the postal service (or delivery service). A post office will often receive mail in a large set of letters and parcels. Batches of letters and parcels from a specific zip code are included in the overall set of mail. The segregation method could be used to locate, for example, all of the letters from a particular zip code contained in an overall set of letters.

The segregation method of the present invention varies from the conventional information extraction method. One such conventional method is classification. The present segregation method uses classification as one step in the overall process of segregation, while certain conventional methods rely solely on classification.

There are three main differences between classification and segregation. First, in conventional classification, the number of classes is larger while in segregation there are only two classes (i.e., the desired, present patterns and all other patterns). This provides an advantage over the conventional classification methods in that increasing the number of classes of patterns increases the complexity of the analysis.

Furthermore, the present segregation method merely should recognize a group that contains a substantial proportion of the instance of the desired pattern, and possibly with a few omissions and erroneously recognized objects. That is, the segregation method accommodates some (generally small) proportion of false negatives and false positives, while still meeting the overall objectives of the bank.

Finally, the segregation method does not need to be followed by an interpretation step. This is important for saving time, decreasing steps and thus decreasing costs.

The present segregation method differs from conventional information extraction methods that use decision support techniques. That is, with the decision support techniques, the goal remains text reading and the methods that are used after the features extraction stage all pertain to the same pattern recognition family (e.g., as character, word, and phrase recognition all belong to the family of text recognition tools).

In contrast, the segregation method of the present invention proposes to combine classifiers that pertain to different domains of machine handling and proposes strategies for segregation that depend, for example, on the way the objects are handled.

Furthermore, while information extraction usually refers to reading some information, document segregation refers to another way of gaining knowledge, namely finding out which are the objects, which carry the information. Instead of learning from the information, which is not possible since the information is assumed to be already known, document segregation enriches knowledge, for instance by recognizing which secondary information, assumed to be significantly more readable by automated means than the information, is also carried by the documents that carry the information.

As an example, a bank may wish to know who wrote a check to a specific company, where the name of that company on the payee line 105 (see FIG. 1) of the check constitutes information. As represented in FIG. 1, the name of the writer of the check and further data such as address and sometimes phone number, is the secondary information. The secondary information appears most often automatically legible.

An additional benefit of the segregation method of the present invention is that the method is adaptive. That is, the method learns and stores information from processing the checks to adapt its profile and processing techniques for future use.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A computer-implemented method for extracting information from a document, comprising:
   analyzing handwritten entries from a plurality of fields on a plurality of documents, wherein more than one of the plurality of fields includes information identifying a recipient of the set of documents;
   extracting information from the handwritten entries of the documents and comparing extracted information to preset information;
   weighting the information extracted from each of the plurality of fields based on a consistency of information extracted from each of the plurality of fields; and
   instructing a processor of the computer to segregate a set of documents from the plurality of documents based on a likelihood that at least one document in said set of documents carries the preset information, said preset information being directed to the recipient of the set of documents.

2. The method according to claim 1, wherein said information is extracted from at least one of a front of said documents and a back of said plurality of documents.

3. The method according to claim 1, wherein said plurality of documents each comprise a check.

4. The method according to claim 1, further comprising:
   combining previously known information with information from said extracting information.

5. The method according to claim 1, wherein said set of documents comprises a known number of documents.

6. The method according to claim 1, wherein said set of documents comprises an approximately known number of documents.

7. The method according to claim 1, wherein said plurality of documents comprises at least one batch of documents having a likelihood of carrying an instance of said preset information.

8. The method according to claim 7, wherein said at least one batch of documents appears sequentially within said plurality of documents.

9. The method according to claim 7, wherein said at least one batch of documents comprises at least one subset of documents in which each document in said subset of documents comprises said preset information.

10. The method according to claim 1, wherein said extracting information comprises at least one of a plurality of information extracting techniques.

11. The method according to claim 10, wherein said plurality of information obtaining techniques comprises preprocessing data associated with an image of said plurality of documents.

12. The method according to claim 10, wherein said plurality of information obtaining techniques comprises segmentation.

13. The method according to claim 10, wherein said plurality of information obtaining techniques comprises classification.

14. The method according to claim 10, wherein said plurality of information obtaining techniques comprises interpretation.

15. The method according to claim 10, wherein the information extracted from each of said extracting information techniques is weighted based on its reliability.

16. The method according to claim 1, wherein said preset information comprises at least one of a single instance of preset information and a plurality of instances of preset information.

17. The method according to claim 1, further comprising:
introducing a marker document into said plurality of documents.

18. The method according to claim 1, wherein said set of documents comprises a set of checks and said recipient comprises a payee of the set of checks.

19. The method according to claim 18, wherein preset information comprises at least one of a payee's name, a payee's endorsement, and a memo line.

20. The method according to claim 19, further comprising simultaneously examining a plurality of pertinent fields on the plurality of documents.

21. The method according to claim 1, wherein the analyzing comprises pattern recognition.

22. The method according to claim 1, wherein the analyzing comprises character recognition and word recognition.

23. The method according to claim 1, wherein the analyzing comprises at least one of character recognition and word recognition.

24. A system of extracting information from a document, comprising:
an analyzing unit that analyzes handwritten entries from a plurality of fields on a plurality of documents, wherein more than one of the plurality of fields includes information identifying a recipient of the set of documents;
an extracting unit that extracts information from the handwritten entries of the documents and compares extracted information to preset information;
a weighting unit that weights the information extracted from each of the plurality of fields based on a consistency of information extracted from each of the plurality of fields; and
a segregation unit that segregates a set of documents from the plurality of documents based on a likelihood that at least one document in said set of documents carries the preset information, said preset information being directed to the recipient of the set of documents.

25. A system of extracting information from a document, comprising:
means for recognizing handwritten indicia from a plurality of fields in a plurality of documents, wherein more than one of the plurality of fields includes information identifying a recipient of the set of documents, wherein information obtained from each of the plurality of fields is weighted based on its consistency; and
means, coupled to said recognizing means, for segregating a set of documents from said plurality of documents based on a likelihood that at least one document in said set of documents carries an instance of a preset information in said indicia, said preset information being directed to the recipient of the set of documents.

26. A computer-readable medium tangibly embodying a program of machine readable instructions executable by a digital processing apparatus to perform a method for extracting information from a document, said method comprising:
analyzing handwritten entries on a plurality of documents;
extracting information from the handwritten entries from a plurality of fields of the documents and comparing extracted information to preset information, wherein more than one of the plurality of fields includes information identifying a recipient of the set of documents;
weighting the information extracted from each of the plurality of fields based on a consistency of information extracted from each of the plurality of fields; and
segregating a set of documents from the plurality of documents based on a likelihood that at least one document in said set of documents carries the preset information, said preset information being directed to the recipient of the set of documents.

27. A method for deploying computing infrastructure, comprising integrating computer-readable code into a computing system, wherein the computer readable code in combination with the computing system is capable of performing a method for extracting information from a document, said method for extracting information from a document, comprising:
analyzing handwritten entries from a plurality of fields on a plurality of documents;
extracting information from the handwritten entries of the documents and comparing extracted information to preset information, wherein more than one of the plurality of fields includes information identifying a recipient of the set of documents;
weighting the information extracted from each of the plurality of fields based on a consistency of information extracted from each of the plurality of fields; and
segregating a set of documents from the plurality of documents based on a likelihood that at least one document in said set of documents carries the preset information, said preset information being directed to the recipient of the set of documents.

28. A system of extracting information from a document, comprising:
a recognition unit that recognizes indicia including handwritten characters from a plurality of fields on a document, wherein more than one of the plurality of fields includes information identifying a recipient of the set of documents;

a weighting unit that weights the characters from each of the plurality of fields based on a consistency of characters recognized from each of the plurality of fields; and a segregating unit that segregates a batch of documents from a plurality of documents based on a likelihood that at least one document in said batch of documents carries an instance of a preset information in said indicia, wherein said recognition unit recognizes said handwritten text on a front side and a rear side of said document, said preset information being directed to the recipient of the set of documents.

29. The system according to claim 28, wherein said document comprises a check.

30. The system according to claim 29, wherein said recognition unit recognizes a payment amount handwritten on said check to determine if said payment amount is in a preset payment amount range.

* * * * *

UNITED STATES PATENT AND TRADEMARK OFFICE
CERTIFICATE OF CORRECTION

PATENT NO. : 7,983,468 B2  Page 1 of 1
APPLICATION NO. : 11/053681
DATED : July 19, 2011
INVENTOR(S) : Tayo Ibikunle et al.

It is certified that error appears in the above-identified patent and that said Letters Patent is hereby corrected as shown below:

Title Pg, Item (73) Assignees
should read:  JPMORGAN CHASE BANK, N.A.
New York, NY (US)

INTERNATIONAL BUSINESS MACHINES CORPORATION
Armonk, NY (US)

Signed and Sealed this
Twenty-seventh Day of September, 2011

David J. Kappos
*Director of the United States Patent and Trademark Office*